March 30, 1965 C. S. FULLER 3,175,975
HEAT TREATMENT OF III-V COMPOUND SEMICONDUCTORS
Filed April 19, 1962
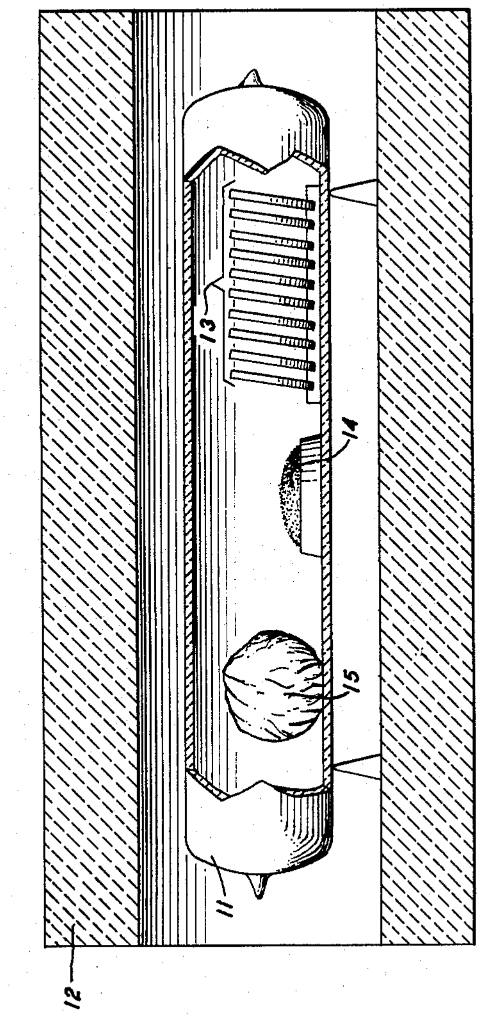
INVENTOR
C. S. FULLER
BY H. W. Lockhart
ATTORNEY United States Patent Office 3,175,975

Patented Mar. 30, 1965

3,175,975

HEAT TREATMENT OF III–V COMPOUND SEMICONDUCTORS

Calvin S. Fuller, Chatham, N.J., assignor to Bell Telephone Laboratories, Incorporated, New York, N.Y., a corporation of New York Filed Apr. 19, 1962, Ser. No. 188,633

1 Claim. (Cl. 252—62.3)

This invention relates to semiconductor device fabrication and particularly to an advantageous technique for processing Group III–Group V semiconductor compounds at high temperatures.

A problem which arises in connection with high temperature processing, generally above 800 degrees centigrade, of semiconductor bodies of Group III–Group V compounds, in particular the arsenides and phosphides, is the deleterious erosion of the prepared surfaces of the semiconductor material. Specifically, it is difficult to produce PN junctions by solid state diffusion in single crystals of III–V compound semiconductors such as gallium arsenide without eroding the carefully polished crystal surfaces thereby often rendering the material unusable for the desired purposes. Although at certain temperatures this effect may be reduced by providing an excess pressure of arsenic, there is still serious erosion at high temperatures. Furthermore, insofar as applicant is aware, oxidizing the surface of the crystal or diffusing from oxide sources, as has been the practice particularly with silicon semiconductor material, does not prevent erosion in the case of the III–V compound semiconductors.

Therefore, an object of this invention is an improved technique for carrying out high temperature heat treatment of III–V compounds.

In particular, an object of this invention is an improved diffusion technique for altering the conductivity type of III–V arsenide and phosphide compounds of gallium and indium by the diffusion thereinto of significant impurities such as sulphur, selenium, cadmium or zinc.

In accordance with this invention, there is provided in the container, in which a high temperature treatment is carried out on a single crystal body of the Group III–Group V semiconductor materials, such as gallium arsenide, a body of the same or similar III–V compound material having a relatively imperfect crystalline structure. Specifically, this auxiliary body of crystalline material may be, for the diffusion of gallium arsenide, a body of polycrystalline gallium arsenide or gallium phosphide. Or, in lieu of polycrystalline material, there may be provided single crystal material which has been strained or deformed or otherwise treated so as to render it relatively imperfect in crystalline structure compared to the single crystal material being diffused. Advantageously, the auxiliary crystal material should not have a lower melting point than the material being treated.

It has been found when the above procedure is followed that upon heating the assembly at temperatures in excess of 800 degrees centigrade for extended periods substantially all of the undesired surface erosion occurs on the imperfect or auxiliary crystalline material rather than upon the polished single crystal material which is being processed. If the heat treatment involves a solid state diffusion, the significant impurity source may be provided in powder form as a separate element within the container. Or, in some cases, it may be advantageous to prealloy the significant impurity with the imperfect auxiliary crystal which then acts as a diffusant source.

Thus, a feature of this invention is the inclusion during any high temperature heat treatment of a III–V compound single crystal semiconductor body of an imperfect crystal of a similar III–V material to reduce the surface erosion of the material being processed.

A better understanding of the invention may be had from the following detailed description taken in conjunction with the drawing which depicts in diagrammatic form apparatus for carrying out a diffusion heat treatment of polished slices of a Group III–Group V semiconductor material.

Referring to the drawing, a sealed container 11, typically of quartz, is positioned within a high temperature furnace represented by the enclosure 12. Sealed within the container is an array of thin slices 13 of monocrystalline gallium arsenide semiconductor material, a source 14 of a significant impurity, sulphur, and a polycrystalline body 15, of gallium arsenide. The slices 13 of gallium arsenide customarily are highly polished on both faces by well-known mechanical and chemical techniques. The auxiliary crystal 15 may be any suitable crystalline material, in some instances produced as a byproduct of other semiconductor device fabrication. Customarily, the container is sealed under partial vacuum and the assembly is then heated to a temperature of over 1000 degrees centigrade for a period of several hours. As is well known, the time and temperature are selected to produce the desired diffusion depth. Typically, for gallium arsenide, temperatures of 1100 to 1200 degrees maintained for periods of several hours produce sulphur diffusion to depths of several tenths of a mil.

Upon removing the elements from the container after completion of the heat treatment and cooling, considerable erosion is found to have occurred on the surface of the auxiliary crystal 15 while the surfaces of the single crystal slices 13 remain essentially free of any pitting or other erosion. The slices then are suitable for further processing into smaller wafers for incorporation in semiconductor devices.

Although the foregoing describes a technique in terms of gallium arsenide, a similar problem exists generally with respect to other of the Group III–Group V compounds such as gallium phosphide, indium phosphide, and indium arsenide. Moreover, it has been found that the auxiliary crystal need not be necessarily of exactly the same compound. For example, an imperfect crystal of gallium phosphide included in the heat treatment chamber has been found to similarly reduce the surface erosion of gallium arsenide material during such heat treatment.

Further, single crystal material may be used for the auxiliary crystal if the surface thereof is abraded or roughened rather than smoothly polished. Also, the auxiliary crystalline material may be introduced in particulate form which effectively increases the exposed surface. As previously indicated, the auxiliary material should preferably have a higher melting point than the temperature obtaining during the heat treatment. Approximate melting points for materials of interest herein are:

| | ° C. |
|---|---|
| Indium phosphide | 1070 |
| Indium arsenide | 940 |
| Gallium phosphide | 1500 |
| Gallium arsenide | 1240 |

In the following examples illustrating this invention, highly polished surfaces were produced on this slice material, typically with an etchant consisting of one volume sulphuric acid, one volume of water, and two volumes of 30 percent Superoxol at a temperature of about 60 degrees centigrade. The slices were agitated in the etchant until mirror-like surfaces were obtained, generally for a period of from one to two minutes.

In one particular example, a single crystal slice of P-type gallium arsenide having a P-type resistivity of about 1000 ohm centimeters was sealed in a quartz container having a volume of about two cubic centimeters. Included also within the container were 50 micrograms of pure sulphur and a small piece of polycrystalline gallium phosphide. After diffusion heat treatment at 1150 degrees centigrade for one hour, the gallium arsenide slice was removed and it was determined that an N-type surface layer approximately 0.5 mil deep was produced over the entire slice with substantially no formation of pits or erosion on the polished surface of the slice.

A similar treatment was carried out omitting the source of pure sulphur diffusant and substituting a gallium phosphide polycrystalline body which was heavily doped with sulphur, specifically, an impurity concentration in excess of $10^{19}$ atoms per cubic centimeter. After heat treatment for one hour at 1100 degrees centigrade, a thin N-type layer of about 0.2 mil thickness was observed with the slice surfaces remaining substantially free of pits or other erosion.

In a further example, a single crystal slice of gallium arsenide having a resistivity of 0.3 ohm centimeter was fused in the presence of pure sulphur to produce a polycrystalline mass which contained a high concentration, in excess of $10^{19}$ per cubic centimeter of sulphur. A small piece of this polycrystalline material, about .01 gram, was sealed under partial vacuum, about $10^{-3}$ millimeters of mercury air pressure, in a container with a slice of P-type single crystal gallium arsenide having a mass of 0.2 of a gram. Also sealed in the container were about 50 micrograms of sulphur. After heat treatment for about one hour at 1100 degrees centigrade, surfaces of the single crystal gallium arsenide were found to be smooth and the slice had an N-type skin to a depth of about 0.2 of a mil.

In a further similar example, the pure sulphur diffusant source was omitted and after heat treatment for one and one-half hours the slice was observed to have highly polished, undamaged surfaces and to have an N-type skin to a depth of about 0.05 mil.

Although the invention has been described in terms of certain specific materials and processes, it has general application to high temperature heat treatments of arsenide and phosphide semiconductor compounds which suffer considerable deleterious surface erosion during such heat treatments. In accordance with this invention, the inclusion in the heat treatment chamber of a relatively imperfect crystalline body of similar Group III–Group V compound material serves to reduce such unwanted surface erosion by itself undergoing such erosion.

Moreover, although the specific examples set forth the use of sealed containers, the technique in accordance with the invention may find use also in open tube or flow type processing.

Accordingly, although the invention has been described in terms of certain illustrative embodiments, it will be understood that modifications may be made by those skilled in the art which likewise will be within the spirit and scope of the invention.

What is claimed is:

In the diffusion heat treatment of a first single crystal gallium arsenide semiconductor body the steps of placing said body in a container in the presence of a small quantity of sulfur and a second crystalline semiconductor body selected from the group consisting of gallium arsenide and gallium phosphide, said second body having comparatively more crystalline imperfections than said first body, and heating said container including said bodies and said sulfur at a temperature in excess of 800 degrees centigrade but below the melting temperature of said first body for a period of time sufficient to enable diffusion of sulfur from said small quantity of sulfur into at least a portion of said first body.

References Cited by the Examiner

UNITED STATES PATENTS

| | | | |
|---|---|---|---|
| 2,798,989 | 7/57 | Welker | 317—237 |
| 2,868,678 | 1/59 | Shockley | 148—1.5 |
| 2,900,286 | 8/59 | Goldstein | 148—189 |

OTHER REFERENCES

Hilsum et al.: Semiconducting III–V Compounds, Pergamon Press, New York, 1961, pages 69–71.

BENJAMIN HENKIN, *Primary Examiner.*

DAVID L. RECK, *Examiner.*